Sept. 9, 1941. W. F. ALLENBY 2,255,478
FOOD WORKING DEVICE
Filed April 11, 1940
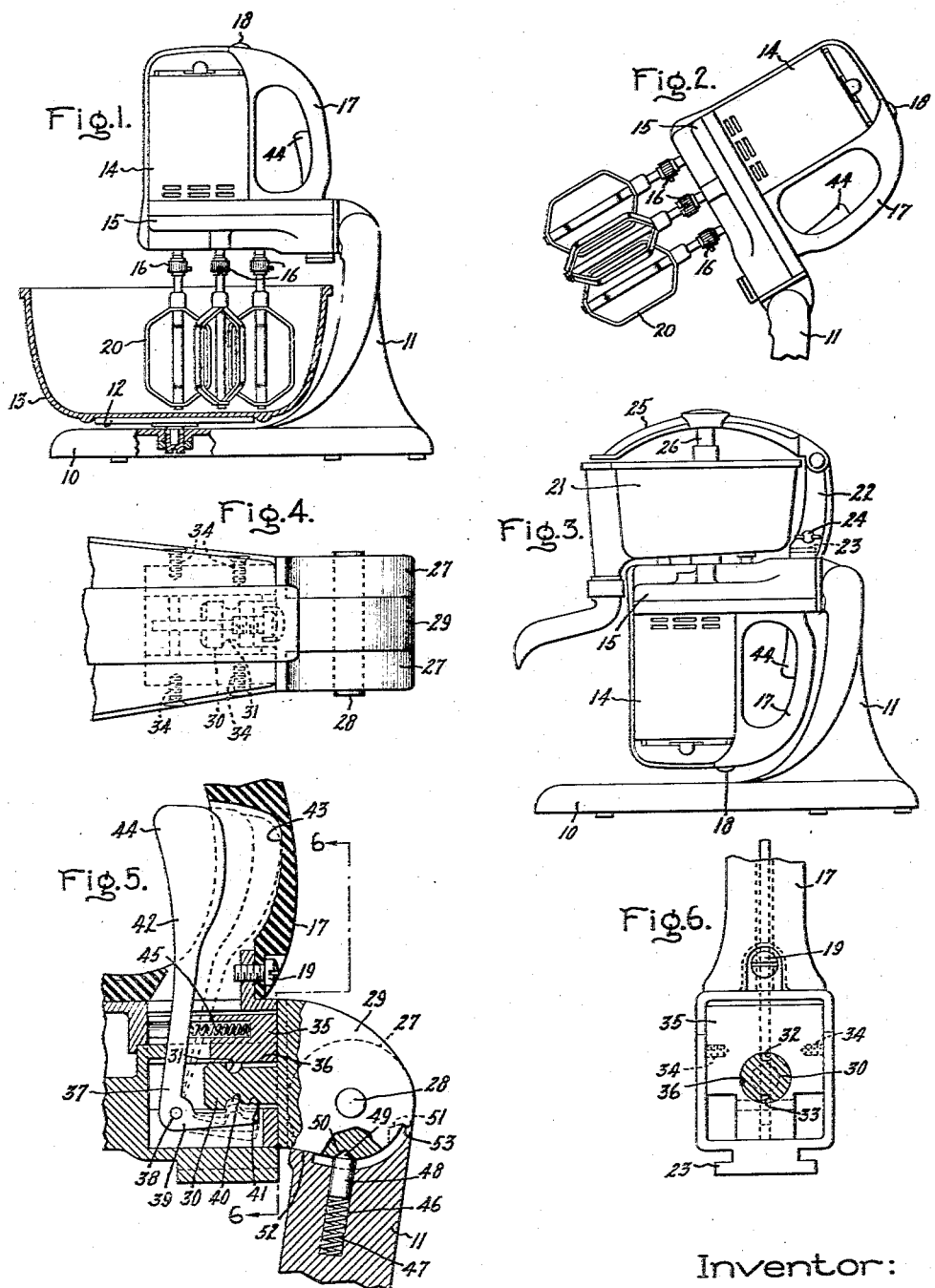
Inventor:
William F. Allenby,
by Harry E. Dunham
His Attorney.

Patented Sept. 9, 1941

2,255,478

UNITED STATES PATENT OFFICE 2,255,478

FOOD WORKING DEVICE

William F. Allenby, Stratford, Conn., assignor to General Electric Company, a corporation of New York Application April 11, 1940, Serial No. 329,118

10 Claims. (Cl. 259—84)

This invention relates to food working devices, more particularly to power driven food working devices used for mixing batters, beating eggs, whipping cream, extracting juice, grinding meats, etc., and has for its object the provision of an improved device of this character which is relatively inexpensive to manufacture and convenient to operate.

This invention is particularly applicable to the type of food working device in which a portable power or food working unit, which comprises a motor and a gear unit, is arranged to be supported on a suitable standard for operation in each of a plurality of positions. With food working devices of this character the power unit is supported on the standard so that in one position the gear unit can be used to drive a beater or other agitator and in another position diametrically opposite the first position the power unit can be used to drive a juice extractor, meat grinder or similar auxiliary appliance. With prior devices of this type it has been necessary to remove the power unit to invert it and thus change from mixing or like operations to juice extraction or other operations. This has resulted in inconvenience and annoyance to the user and in some instances damage to the finish of both the support and power unit casing due to accidental collision between the two when the unit is being inverted.

In its primary aspect this invention contemplates the provision of improved means for mounting the power unit of a food working device on its supporting standard so that it may be moved to its different food working positions without removing the unit from the supporting standard.

This invention also contemplates improved means for latching the power unit in either of its different food working positions.

Moreover, this invention contemplates the provision of improved means for removably supporting the food working unit on its supporting standard so that it can be removed, from the standard for operation in other locations and for tiltably supporting the food working unit on the standard so that when it is in the food mixing position it may be tilted back on the standard an amount sufficient to remove the beater or agitator elements from the mixing bowl or container mounted on the support.

In accordance with this invention, I have provided means for rotatably supporting a food working unit on its supporting standard so that the food working unit may be easily turned from one food working position to another without removing the unit from the supporting standard. In addition, the supporting means are constructed and arranged so that the food working unit may be tilted back upon the supporting standard or may be removed from the standard if it is desired to use the unit in other locations such as in a utensil that is being heated on a range.

Specifically, I have provided in accordance with this invention improved means for rotatably supporting a vertical type food working unit on its supporting standard so that the unit may be rotated about an axis substantially parallel to the longitudinal axis of the base of the supporting standard. I have also provided latch means for latching the food working unit in either the position in which it receives a juice extracting or food grinding unit or the position in which it receives a beater or other agitator unit and the latch means are arranged so that in one position thereof the food working unit may be removed from the pedestal. Moreover, the latch means are arranged so as to be conveniently and easily manipulated.

Further advantages of this invention not already set forth will become apparent as the following description proceeds and the features of novelty which characterize this invention will be set forth in the claims appended to and forming a part of this specification.

For a more complete understanding of this invention reference should be had to the accompanying drawing in which Fig. 1 is a side elevation of a vertical type food working device embodying my invention and showing the power unit in working position on its standard for beating, whipping, mixing and like food working operations; Fig. 2 is a fragmentary view similar to Fig. 1 illustrating the power unit in the non-working position, that is, in a position in which the agitator elements thereof are removed from a mixing bowl; Fig. 3 is a side elevation of a vertical type food working device illustrating the power unit in the inverted position on its standard for other operations, in this instance juice extraction; Fig. 4 is a fragmentary plan view showing details of my improved mounting means for the food working unit; Fig. 5 is a side elevation of Fig. 4 partly in section showing additional details of my improved mounting arrangement; and Fig. 6 is an end elevation partly in section taken on the line 6—6 of Fig. 5 and looking in the direction of the arrows.

Referring to the drawing, my invention has been shown in one form as applied to a portable food working device, such as used in household kitchens and the like. This food working device comprises a base 10 upon one end of which is provided a standard 11. Rotatably mounted on the base 10 is a turntable 12 which is adapted to support a suitable mixing bowl 13 during use of the device for mixing purposes.

Mounted on the standard in a manner to be described presently is the food working or power unit which comprises a suitable electric motor 14 upon one end of which is a gear casing 15 enclosing suitable gears (not shown) for driving a plurality of spindles 16. The food working unit is provided with a suitable handle 17 one end of which is secured to one end of the motor by means of screw 18 and the other end of which is secured to the gear housing 15 by means of screw 19 (Fig. 5).

As previously described, the food working unit is adapted to be used in one position for mixing, whipping or similar operations and in another position for driving auxiliary appliances such as a juice extractor, meat grinder and the like. When used for mixing operations, suitable beater or agitator elements 20 are attached to the spindles 16 and the power unit is positioned on the standard as shown in Fig. 1 so that the beater elements will extend into the mixing bowl 13. When the unit is used for other operations, the beater elements are removed and the unit is positioned on the standard as shown in Fig. 3. When so positioned, the auxiliary appliances may be driven from one of the spindles 16. As an example, I have shown the unit in Fig. 3 driving a juice extractor which comprises a bowl 21 in which is mounted a reamer (not shown) which is driven by one of the spindles 16. The particular juice extractor shown is also provided with a clamping device for holding the fruit being operated upon. The clamping device comprises an arm 22 which is releasably secured to the gear housing 15 by means of trackway 23 and a clamping screw 24. Pivoted to the end of the arm 22 is the pressure arm 25 to which is secured a rod 26 upon the end of which is secured a fruit holding disk (not shown).

In accordance with this invention I have provided improved means for supporting the food working device on the standard 11 so that it may be moved from the food working position shown in Fig. 1 to the food working position shown in Fig. 3 without necessitating removal of the food working unit from the standard. Moreover, I have provided in accordance with this invention improved supporting means by which the food working unit, when being used for mixing or similar operations, may be tilted back to the position shown in Fig. 2 so that the beater elements 20 are removed from the bowl 13 and the unit is in a non-working position. Further, my improved mounting means are arranged so that, if desired, the power unit may be removed from the standard for operation in other locations.

The specific embodiment of my improved means for mounting the food working unit on the standard is clearly shown in Figs. 4–6 of the drawing. Referring to these figures, it will be observed that the upper end of the standard 11 is forked so as to define leg portions 27. Pivotally mounted between the portions 27 by means of a pivot pin 28 is a hinge member 29 from the central portion of which extends a stud shaft or swivel pin 30. Provided near the outer end of the stud shaft is a circumferential groove 31 and extending longitudinally from this groove at the top and bottom of the shaft are additional grooves 32 and 33 respectively (see Fig. 6). Secured within the casing 15 by means of screws 34 or, if desired, integrally formed with the casing 15, is a bearing member 35 having an opening 36 which is adapted to receive the stud shaft 30 so that the shaft is rotatably journaled therein. By means of this arrangement, the food working device will be rotatably supported on the standard 11 so that the unit as a whole may be rotated about an axis substantially parallel to the longitudinal axis of the base 10. With such a rotatable connection between the standard and the power unit, the unit may conveniently and readily be rotated from the position shown in Fig. 1 to the position shown in Fig. 3 or vice versa without removing the unit from the standard.

In order to latch the power unit to the stud shaft and also to latch the unit in either the position shown in Fig. 1 or the position shown in Fig. 3 I have provided a bell crank latch or lever member 37 which is pivotally mounted at 38 in the housing of the gear reduction unit. As shown in Fig. 5, the arm 39 of the bell crank lever 37 extends outwardly toward the stud shaft 30 and is provided intermediate its ends with an abutment or key 40 which is adapted to lie in the groove 31 so as to latch the food working unit releasably in position on the stud shaft. Provided at the end of the arm 39 is a second abutment which forms a key 41 which is adapted to lie in either the slot 32 or the slot 33 to latch the food working unit in either the position shown in Fig. 3 or the position shown in Fig. 1 respectively. The other arm 42 of the bell crank latch member extends upwardly through the gear housing 15 and into a recess 43 provided at the lower end of the handle 17. The upper end of this arm is provided with an enlarged portion 44 which projects outwardly from the surface of the handle as shown in Figs. 1, 2, 3 and 5. By this latter construction the operator may readily manipulate the latching lever by simply holding the handle 17 near the latch 44 and pressing inwardly on the latch an amount necessary to perform the desired releasing. A suitable spring 45 is provided for biasing the latching lever outwardly to the position shown in the full lines in Fig. 5.

In addition to providing the swivel and removable connection described above, my improved mounting arrangement is such that the food working unit may be rotated from the operative position shown in Fig. 1 to the relatively inoperative position shown in Fig. 2. This is accomplished through the pivotal connection of the hinge member 29 with the forked ends 27 of the supporting standard 11. In order to latch the food working unit frictionally in either the position shown in Fig. 1 or the position shown in Fig. 2 there is provided in the bottom of the forked portion of the standard an opening 46 in which is provided a spring 47 which supports a movable pin 48. This pin 48 is provided with a conical end 49 which is adapted to engage one of the recesses 50 or 51 provided in the lower periphery of the hinge member 29. When the pin 48 is in engagement with the recess 50, the power unit is frictionally latched in the food working position shown in Fig. 1 and when the pin 48 engages the opening 51 the power unit is frictionally latched in the non-working position shown in Fig. 2. In order to limit the extent of the tilting movement of the power unit and thereby positively define its working and non-working positions, two stops 52 and 53 are provided. The stop 52 consists of a projection located between the forked ends of the standard 11. This projection limits pivoting of the food working unit in the counterclockwise direction and therefore defines the food working position shown in Fig. 1. The stop 53 on the other hand consists of a projection on the hinge member 29. This projection engages the pin 48 to limit clockwise rotation of the power unit and hence defines the non-working position shown in Fig. 2.

It is believed that the operation of my improved mounting arrangement for a household mixer is apparent from the foregoing detailed description. However, to emphasize the salient features of this mounting arrangement, the operation of the unit will now be more fully described. It will be assumed that the power unit is connected to the standard so as to be in the position shown in Fig. 1. In this position, the portion 40 of the lever 37 lies in the circumferential groove 31 so as to prevent removal of the power unit from the standard and the end portion 41 lies in the longitudinal groove 33 so as to prevent relative rotation of the power unit on the swivel pin 30. It will also be observed that in this position the spring member 45 biases the lever 37 outwardly so that the latch is resiliently secured in the latching position described above. When in this position, the food working unit is adapted to be used for mixing, whipping or other similar operations. If it is desired to remove the beater elements 20 from the mixing bowl 13 during the mixing or whipping operation, it is merely necessary to tilt the food working unit backward on the pivot pin 28. At the start of this tilting movement, it will be necessary to give the handle 17 a slight tug in order to release the biased pin 48. The unit may then be freely moved to the tilt back position shown in Fig. 2 in which position the pin 48 will be engaged by the stop 53 and will simultaneously drop into the opening 51 to latch the unit in the tilt back position.

If now it is desired to use the food working device for juice extraction or meat grinding operations, the beater elements 20 will be removed from the power unit and the bowl 13 will be removed from the supporting pedestal. Then by touching the end 44 of the latching lever and pressing inwardly an amount shown as the first dotted position in Fig. 5 the key 41 on the end of arm 39 will be moved out of engagement with the groove 33 and the entire unit may be rotated about the shaft or pin 30 until it is in the position shown in Fig. 2. The end 44 will then be released and under the influence of spring 45 the key 41 will engage the longitudinal groove 32 to latch the power unit in the position shown in Fig. 3. In performing this turning operation the end 44 of the latch lever will be depressed only an amount sufficient to cause the key 41 to move out of the longitudinal groove. The circumferential groove 31 in the stud shaft and the abutment 40 are so constructed that in this restricted movement of the latch lever the abutment 40 does not move out of the groove 31 and hence the latch between the food working unit and the standard is not effected.

To remove the unit from the standard so that it may be used for mixing operations in another location, it is merely necessary to depress the end 44 of the lever the amount shown as the second dotted position in Fig. 5. In this position the abutment 40 will be moved clear of the circumferential groove 31 so that by moving the power unit to the left, as shown in Fig. 1, it may be moved off the standard 11.

From the foregoing it will be observed that I have provided an improved arrangement for mounting the food working unit of a household mixer so that the unit may be moved to different food working positions without it being removed from its supporting standard. In the foregoing description I have described the unit as having two different food working positions in which it is rotatably latched. It is, of course, apparent that by means of my improved mounting arrangement the food working unit may be rotated to other positions than the two described and may or may not be latched in these other positions as desired. For example, with the mounting and latching arrangement described above, it is possible during mixing operations to move the key 41 from the slot 33 and pivot the unit about the shaft 30 so as to move the beater elements 20 in the mixing bowl in order to facilitate the mixing operation.

Moreover, while I have described my invention as particularly applicable to household mixers of the vertical type, it is apparent that the mounting arrangement of this invention may be readily adapted to other types of household mixers, for example, those in which the shaft of the motor unit extends horizontally. Therefore, while I have described one modification of my invention, it will be understood that I do not intend to be limited thereto since many other modifications may be made and I intend in the appended claims to cover all such modifications as are within the true spirit and scope of this invention.

What I claim as new and desire to secure by Letters Patent of the United States is:

1. In a food working device, a standard, a food working unit, and means for supporting said unit on said standard, said means comprising a hinge member pivotally mounted on said standard so that said food working unit may be tilted between a working and a non-working position, means engaging said hinge member for frictionally latching said food working unit in either the working or non-working position, a stud shaft on said hinge member, a socket on said food working unit adapted to receive said stud shaft so that said unit may be rotated relative to said stud shaft, a latch member on said food working unit, said stud shaft cooperating with a portion of said latch member to removably latch said unit on said stud shaft, and additional means on said stud shaft cooperating with said latch member to releasably latch said unit against rotation on said stud shaft whereby said unit may be supported in a plurality of different positions.

2. In a food working device and the like that is provided with a standard and a power unit supported on said standard, a hinge structure for mounting said power unit on said standard comprising a hinge member pivotally mounted on said standard so that said power unit may be tilted between a working and non-working position, a stud shaft on said hinge member, a socket on said power unit adapted to receive said stud shaft, and means on said power unit for releasably latching said unit against rotation on said shaft and for removably latching said unit on said shaft.

3. In a food working device, a supporting standard, a power unit having a driving shaft with a portion projecting from said power unit, said driving shaft when extending vertically downward being adapted to drive beater elements and when extending vertically upward being adapted to drive an auxiliary appliance such as a juice extracting element, a stud shaft pivotally mounted on said standard, a socket in said power unit for receiving said stud shaft so that said unit is rotatably mounted on said standard, means for removably latching said power unit on said stud shaft, and means for latching said power unit relative to said stud shaft so that it will be releasably held either with the driving shaft extending vertically upward or vertically downward.

4. In a food working device, a supporting standard, a food working unit, and means for mounting said food working unit on said standard, said means comprising a hinge member permanently pivoted to said standard, a stud shaft extending from said hinge member and having a circumferential groove near its outer end and longitudinal grooves extending from said circumferential groove at the top and bottom of said stud shaft, a socket on said power unit for receiving said stud shaft so that said unit is removably and rotatably mounted thereon, means for removably engaging said circumferential groove to latch said power unit removably on said stud shaft, and means for removably engaging said longitudinal grooves so as to latch said power unit releasably against rotation on said stud shaft.

5. In a food working device, a supporting standard, a power unit having a driving shaft projecting from one end of said power unit, said driving shaft when extending vertically downward being adapted to drive beater elements and when extending vertically upward being adapted to drive an auxiliary appliance such as a juice extractor, a stud shaft pivotally mounted on said standard having a circumferential groove adjacent its outer end and longitudinal grooves extending from said circumferential groove at the top and bottom of said stud shaft, a socket in said power unit for receiving said stud shaft so that said unit is rotatably mounted on said standard and can be moved from the position in which said driving shaft extends vertically upward to the position in which said driving shaft extends vertically downward without removing said unit from said stud shaft, latching means pivotally mounted in said socket having a portion adapted to selectively engage one of said longitudinal grooves to releasably latch said power unit in either of its two food working positions and having a second portion engaging said circumferential groove for removably latching said unit on said stud shaft.

6. In a food working device, a supporting standard, a power unit adapted to be supported on said standard so that its axis lies in a substantially vertical plane, a handle on said power unit, and means for mounting said power unit on said standard comprising a hinge member permanently pivoted on said standard, a stud shaft on said hinge member, means defining an opening in said power unit for receiving said stud shaft whereby said power unit may be rotated between different working positions without removing said unit from said stud shaft, and means for releasably latching said power unit on said stud shaft, said last mentioned means having a portion extending into said handle whereby manipulation of said latching means may be readily effected.

7. In a food working device, a supporting standard, a power unit having a vertically extending driving shaft and a handle, and means for mounting said power unit on said supporting standard comprising a stud shaft permanently pivoted on said supporting standard and having a circumferential groove adjacent its outer end and longitudinal grooves extending from said circumferential groove at the top and bottom of said stud shaft, a bearing opening in said power unit adapted to receive said stud shaft so that said unit is rotatably mounted thereon, and latch means on said power unit having a portion engaging said circumferential groove for releasably holding said unit on said stud shaft and a portion engaging said longitudinal grooves for releasably latching said power unit either with said driving shaft extending vertically upward or said driving shaft extending vertically downward, said latch means having a portion extending into said handle so that manipulation of said latch can readily be effected.

8. In a food working device, a base having a longitudinal axis, a standard mounted on said base, a food working unit having a plurality of food working positions, a handle on said food working unit, means for rotatably mounting said food working unit on said standard so that said unit may be rotated about an axis substantially parallel to said longitudinal axis of said base and thereby moved from one food working position to the other without lifting said unit relative to said standard, and means for releasably latching said unit against rotation in any of its food working positions, said means having an actuating portion extending into said handle.

9. In a food working device, a supporting standard, a power unit having a driving shaft, a handle on said power unit, a stud shaft mounted on said standard, a socket in said power unit for receiving said stud shaft so that said unit is rotatably mounted on said standard whereby said unit may be rotated so that said driving shaft is arranged in different food working positions, a latch member pivotally mounted on said power unit having a latching portion extending into said socket and an actuating portion extending into said handle, and means on said stud shaft cooperating with said latching portion of said latch member to latch said unit releasably against rotation on said stud shaft so that said unit is releasably latched in each of said different food working positions.

10. In a food working device, a supporting standard, a stud shaft mounted on said standard, a power unit, a handle on said power unit, a socket in said power unit below said handle for receiving said stud shaft so that said unit is rotatably mounted on said standard and may be positioned in different food working positions without removing said unit from said standard or lifting said unit relative to said standard, a latch member pivotally mounted on said power unit having a releasing portion extending into said handle and a latching portion extending into said socket, and means comprising grooves on said stud shaft adapted to receive said latching portion to latch said unit releasably against rotation on said shaft so that said unit is releasably held in each of said different food working positions.

WILLIAM F. ALLENBY.

CERTIFICATE OF CORRECTION.

Patent No. 2,255,478. September 9, 1941.

WILLIAM F. ALLENBY.

It is hereby certified that error appears in the printed specification of the above numbered patent requiring correction as follows: Page 3, second column, line 54, claim 1, before "said" insert the words --means on--; and that the said Letters Patent should be read with this correction therein that the same may conform to the record of the case in the Patent Office.

Signed and sealed this 28th day of October, A. D. 1941.

(Seal)

Henry Van Arsdale,
Acting Commissioner of Patents.